United States Patent [19]

Watson

[11] Patent Number: 4,625,363
[45] Date of Patent: Dec. 2, 1986

[54] SQUIRREL SKINNING APPARATUS

[76] Inventor: Talmadge G. Watson, 302 Blake Dr., Vicksburg, Miss. 39180

[21] Appl. No.: 814,058

[22] Filed: Dec. 27, 1985

[51] Int. Cl.⁴ .......................... A22B 1/00; A22B 5/00
[52] U.S. Cl. ........................................ 17/44.2; 17/21
[58] Field of Search .................... 17/44, 44.1, 44.2, 21

[56] References Cited

U.S. PATENT DOCUMENTS

| 740,964 | 10/1903 | Wintsch, Jr. | 17/44 |
| 2,830,840 | 4/1958 | Johnson | 17/44 X |
| 3,137,030 | 6/1964 | Varner | 17/44.3 X |
| 3,570,049 | 3/1971 | Muckelrath | 17/44.2 |
| 4,094,041 | 6/1978 | Steed | 17/44.1 X |

Primary Examiner—Willie G. Abercrombie
Attorney, Agent, or Firm—Wigman & Cohen

[57] ABSTRACT

A squirrel skinning holder has a unitary one-piece construction which includes a vertically extending portion in which is disposed a slot, so dimensioned as to receive the body of a squirrel in the area of the chest just below the shoulders. Two additional slots, disposed on either side of the first slot, are each dimensioned so as to receive the hind leg of a squirrel in the area just above the foot joint. The holder is supported against an upright by a back portion and the slots are spaced from the back portion by a laterally extending central portion. The two spaced portions have substantially the same dimension, so that the holder presents a compact, easily portable profile. A method of skinning a squirrel is also disclosed where the body of the squirrel is supported in the area of the chest just below the shoulders when removing the skin from the squirrel's lower body.

7 Claims, 4 Drawing Figures

SQUIRREL SKINNING APPARATUS

BACKGROUND OF THE INVENTION

1. Field of the Invention

The present invention relates to a holder and more particularly to a means for holding a squirrel while it is being skinned and dressed. 2. Description of the Prior Art A number of devices are known in the prior art for holding squirrels, rabbits, poultry and other small animals while they are being skinned or dressed. These devices generally have means to impale the animal to hold it for skinning or cleaning. Examples of U.S. patents disclosing devices for impaling the animal are U.S. Pat. Nos. 3,137,030 to Varner and 4,094,041 to Steed. Impaling the animal is a distasteful and potentially hazardous task.

Other prior art holding means employ a construction having two or more parts for gripping the animal. Examples of such multi-part skinning supports are shown in the following U.S. Pat. Nos.: 3,568,243 to Hines; 3,570,049 to Muckelrath; 3,945,083 to Heightshoe; 4,506,411 to Ivy; and 4,543,688 to Barchus. Furthermore, those prior art devices are relatively large and bulky and thus cannot be conveniently carried by a hunter so as to permit him freedom of movement in the woods. Additionally, many of the prior art supports having two or more parts are more expensive to manufacture, more subject to breakdown, and are less convenient to mount to a support for a skinning and dressing operation.

Other, less relevant prior art patents uncovered during a search are as follows: U.S. Pat. Nos. 2,830,319 to Muntz; 2,981,972 to Zebarth; 3,188,130 to Pietrowitz; 3,623,187 to Grubbs; 4,054,968 to Statz; 4,099,294 to Taber; and 4,425,678 to Pepper.

SUMMARY AND OBJECTS OF THE INVENTION

In view of the foregoing limitations and shortcomings of the prior art devices, as well as other disadvantages not specifically mentioned above, it should be apparent that there still exists a need in the art for a compact, durable, lightweight, less expensively manufactured squirrel skinning holder and an easier, more reliable, and safer squirrel skinning method. It is, therefore, a primary objective of this invention to fulfill this need by providing a unitary squirrel skinning holder having a slot which is dimensioned so as to support a squirrel in the area of the chest below the shoulders, and which presents a low profile and is thus easily carried in the pocket by a hunter.

More particularly, it is an object of this invention to provide a squirrel skinning device having a back portion for support against an upright member, a central portion extending outwardly from the back portion and a squirrel support portion having four upwardly extending tines forming therebetween three flared slots, whereby a squirrel may be retained in the slots for easy skinning.

Another object of the present invention is to provide a holder for securely holding a squirrel for skinning such that the squirrel will not be decapitated during skinning.

Briefly described, the aforementioned objects are accomplished according the invention by providing a squirrel skinning holder formed of a strong, lightweight material having a back portion for lateral support against an upright member, a central portion extending substantially perpendicularly away from the back portion and a squirrel supporting portion extending vertically from the central portion and disposed in a plane substantially parallel to the plane of the back support and which has four upwardly extending tines forming three slots therebetween. The central slot, formed by the two inner tines, is dimensioned in size so as to receive the body of a squirrel in the area of the chest just beneath the squirrel's shoulders. The two outer slots, each being formed by the outer edge of one of the central tines and the inner edge of the adjacent, cooperating outer tine, are dimensioned so as to receive one of the hind legs of a squirrel at a position just above the foot and beneath a joint on the leg. The squirrel support means is provided with means whereby it may be fixed to an upright member.

To skin a squirrel, the squirrel is first placed with its belly towards the upright, so that each hind leg is supported by one of the outer slots. The tail and the upper body portion of the squirrel's skin is then removed in a known manner. The legs of the squirrel are then removed from the outer slots and the squirrel is repositioned in the central slot, with its head up and facing outwardly, so as to be securely supported at its chest beneath the front legs. The skin is then removed from the belly and hind portions of the squirrel.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
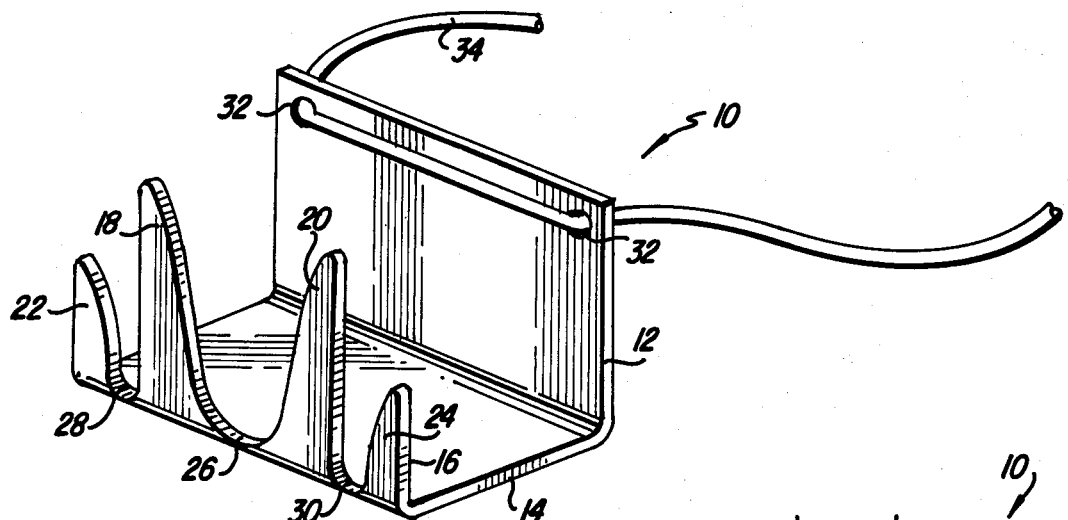
FIG. 1, is a perspective view of the squirrel skinning apparatus according to the present invention.
Figure 2:
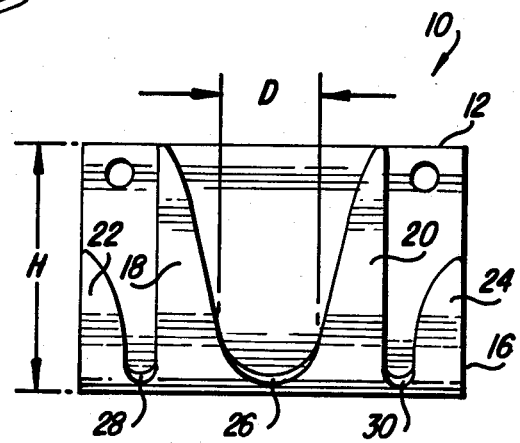
FIG. 2 is a front elevation of the squirrel skinner of the present invention showing the arrangement of tines and slots.

Referring now in detail to the drawings, there is illustrated a squirrel skinning holder constructed according to a preferred embodiment of the invention and designated generally by reference numeral 10. Holder 10 comprises a back portion 12, a central portion 14, and a squirrel-support portion 16 which is disposed in a plane substantially parallel with the plane of back portion 12 and which is laterally spaced therefrom by central portion 14. Back portion 12, central portion 14, and squirrel-support portion 16, form a unitary, one-piece construction, fabricated from a single sheet of material, preferably a piece of 3/32-inch aluminum stock. Other materials may be used including sheet steel and plastics.

Squirrel-support portion 16 comprises four tines, a pair of inner tines 18,20, and a pair of outer tines 22,24. The four tines define three slots as follows: the inner tines 18 and 20 define a central slot 26; inner tine 18 and outer tine 22 define an outer slot 28; and inner 20 tine and outer tine 24 define another outer slot 30. Inner slot 26 has a width dimension D near the base thereof which is so sized as to receive and firmly support a squirrel's body in the area of its chest beneath its shoulders, in other words, at the squirrel's armpits. This method of support enables a great downward force to be applied to the skin without the possibility of the squirrel's head separating from the body or slipping through the support as is frequently the case in the prior art devices. Inner tines 18 and 20 are, furthermore, configured so as to provide a V-shape or taper to the slot 26 to permit a wedging action of the body of the squirrel and also to accommodate different sizes of squirrels.

Each of the outer slots 28,30 is dimensioned so as to receive the hind leg of a squirrel, in the area just above the foot joint. Slots 28,30 are flared to provide a wedge shape so as to smoothly receive the hind legs of the squirrel and furthermore to accomodate different sizes of squirrels.

It will be appreciated that upwardly extending tines 18 and 20 have a dimension H which is substantially the same as the height of the back portion 12. Thus, while central portion 14 supports the squirrel-support portion 16 in a cantilever fashion spaced from back portion 12 to accommodate the upper body of the squirrel and to allow a great pulling force to be exerted during squirrel skinning, the overall height of the squirrel skinning holder 10 is maintained at a minimum. The squirrel skinning holder is thus compact and is easily carried in a pocket or pouch so that a hunter may carry it along with him while he is in the woods.

Figure 3:
FIG. 3 is a front view of the squirrel skinner mounted on an upright and illustrating a squirrel supported by the outer slots.

Turning now to FIG. 3, the method of using the apparatus of the present invention is depicted. The inventive squirrel skinning holder 10 is shown suspended from an upright 36, which may be a tree, pole or shed wall, by means of a stout cord 34 which may be, for example, nylon cord which is looped through holes 32 in back portion 12 of the holder. Cord 34 is tied firmly to upright 36 at about the level of the chest of the skinner to firmly fix the holder 10 against the upright. The skinner pulls down on the tines. The flat back portion of the holder, in cooperation with cord 34, firmly retains the holder against the upright in response to the downward force.

Next, a squirrel 38 is hung head-down in holder 10 by placing each of the hind legs of the squirrel in one of the outer slots 28,30. The squirrel is hung with its belly towards the upright and its tail out. Each hind leg is retained in its respective slot by the joint on the hind leg just above the foot. The hind leg is placed in the slot so that the joint is positioned in the space between squirrel support portion 16 and back portion 12. The spading is provided by central portion 14, which also permits a great downward force to be applied during skinning.

Skinning is started at the base of the tail of squirrel 38. The skin is cut down the back and around the flank and then up the other side of the back, leaving a portion of skin attached to the tail. The tail of the squirrel is then held in one hand while the small portion of the skin which has been left attached to the tail is grasped in the other. The tail and small piece of skin are then pulled downwardly until the entire skin is stripped from the upper body of the squirrel. The use of the leverage gained by holding the tail with one hand and pushing down on the skin with the other minimizes the strength required by the skinner.

The squirrel is now removed from the skinning holder and the holder is cleaned of any loose fur which may have accumulated on it.

Figure 4:
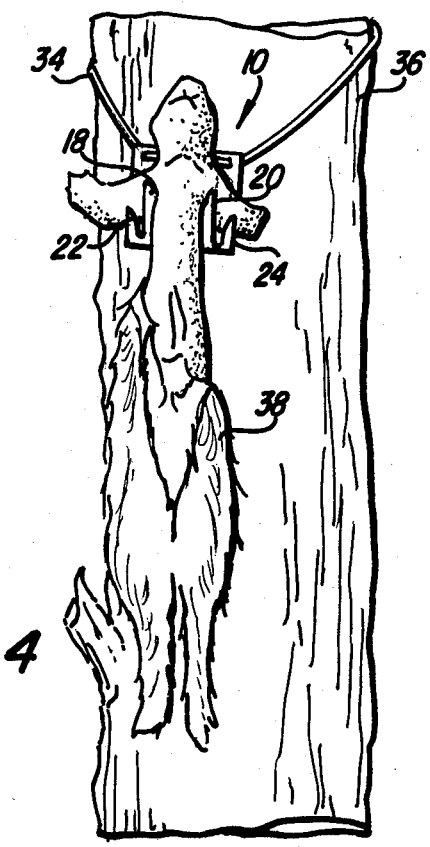
FIG. 4 is a frontal view of a squirrel skinner showing a squirrel supported beneath its front legs at the chest in the central slot.

Referring now to FIG. 4, the next step of the method of using the inventive apparatus is shown. After the upper body skin has been removed as described above, the squirrel is positioned in central slot 26 of holder 10 in the area of the squirrel's chest just below the shoulders, i.e., the armpits. The squirrel is positioned with its head up, its back to the tree and its belly out. In this position, the forelegs of the squirrel, its shoulders and its head are located in the space between squirrel-support portion 16 and back portion 12 provided by laterally extending central portion 14. The skin of the squirrel is peeled back and gripped in the area where it has been previously cut and is then pulled down to complete the skinning operation. The animal may also be eviscerated and cleaned in this position.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A squirrel skinning holder fabricated from a single sheet of material comprising:
a back portion having means for fixing the holder to an upright;
a central portion laterally extending from said back portion;
a squirrel support portion extending vertically from said central portion in a plane substantially parallel to the back portion, said squirrel support portion having formed thereon a pair of upwardly extending inner tines and a pair of upwardly extending outer tines, said inner tines forming a central V-shaped slot therebetween, one of said inner tines and one of said outer tines forming a first outer slot therebetween and the other of said inner tines and the other of said outer tines forming a second outer slot, said first and second outer slots being disposed on respective opposite sides of said central slot, each of said outer slots being flared to provide a wedge shape and dimensioned so as to receive a respective hind leg of a squirrel just beneath the foot joint and said central slot being dimensioned so as to receive the body of a squirrel in the area of the chest just below the forelegs.

2. The holder of claim 1 wherein the height of said inner tines is substantially equal to the height of said back portion.

3. The holder of claim 1, wherein the height of said outer tines is less than the height of the inner tines.

4. The holder of claim 1, wherein the outermost edges of the inner and outer tines are substantially parallel to one another.

5. The holder of claim 1, wherein said central slot and said outer slots are formed only in said vertically extending squirrel support portion.

6. The holder of claim 1, wherein said sheet of material is 3/32 inch aluminum sheet stock.

7. The holder of claim 1, wherein said means for fixing the holder to an upright comprises a pair of holes in the back portion and a cord looped through said holes.

* * * * *